J. W. DOZIER.
FEEDERS FOR THRASHING-MACHINES.

No. 181,923.  Patented Sept. 5, 1876.

WITNESSES:  INVENTOR:
J. W. Dozier
BY
ATTORNEYS.

UNITED STATES PATENT OFFICE.

JESSE W. DOZIER, OF NASHVILLE, TENNESSEE.

IMPROVEMENT IN FEEDERS FOR THRASHING-MACHINES.

Specification forming part of Letters Patent No. 181,923, dated September 5, 1876; application filed June 30, 1876.

*To all whom it may concern:*

Be it known that I, JESSE W. DOZIER, of Nashville, in the county of Davidson and State of Tennessee, have invented a new and Improved Feeder for Thrashing-Machines; and I do hereby declare that the following is a full, clear, and exact description of the same.

The invention relates to an adjustable device for compressing and automatically regulating the quantity of grain fed to the thrashing-cylinder. The invention also relates to an arrangement of rods upon which the grain is conveyed from the traveling apron to the thrashing-cylinder, as hereinafter described.

Figure 1:
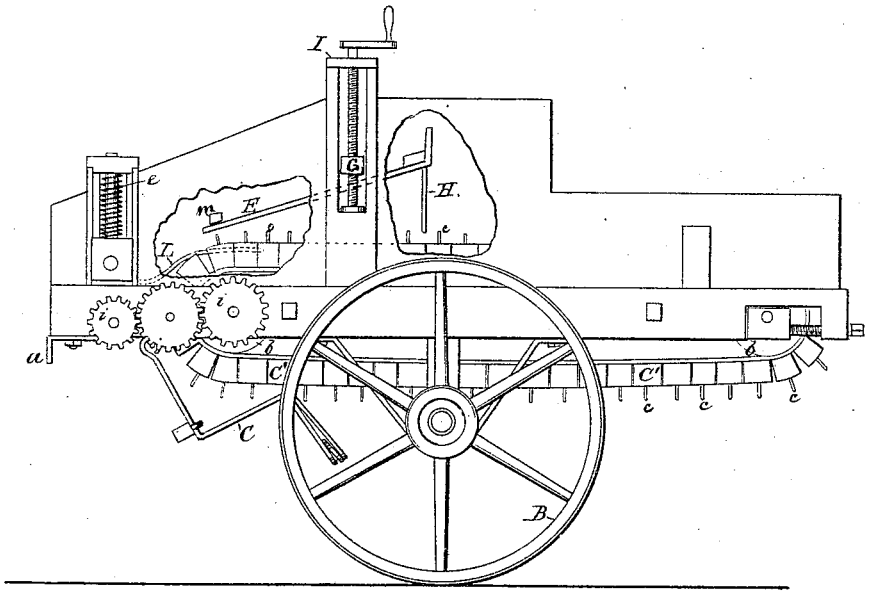
Figure 2:
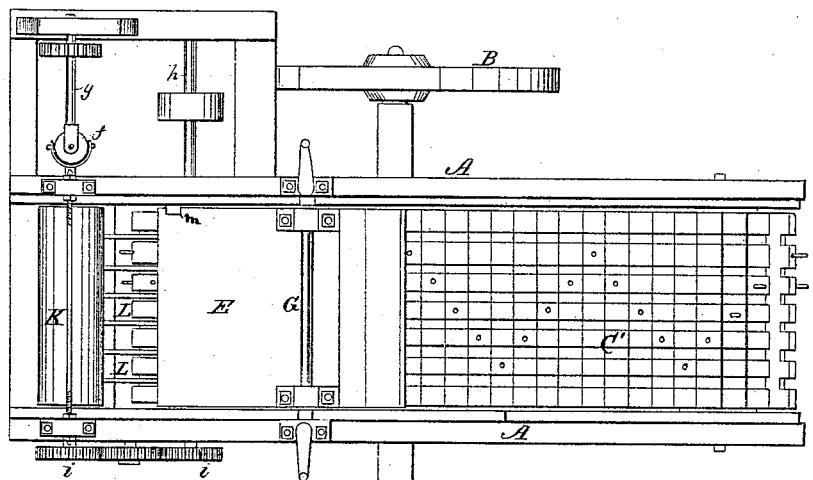

In the accompanying drawing, forming part of this specification, Figure 1 is a side elevation of the machine, with part in section. Fig. 2 is a top view of the machine.

The working parts of the feeder are attached to a box or frame, A, which is mounted upon transporting-wheels B, and provided with hooks or arms $a$, for connecting it rigidly to the frame of the thrasher for practical operation. But in passing from one field or place to another, it is necessary to employ a flexible connection between the feeder and thrasher; and for this purpose I have provided a coupling device, C, which is hinged to the under side of the box or frame A, as shown in Fig. 1. The floor or bottom of the feeder is formed by an endless flexible traveling apron, C', which passes around rotating rollers or shafts $b$, and whose transverse bars are provided with short teeth $c$. I prefer said teeth shall incline slightly to the right, or toward the front of the machine, and be arranged in diagonal lines extending across the apron. The grain-straw to be fed to the thrashing-cylinder is pitched or otherwise deposited upon the apron C' in any quantity, no care being in this respect necessary, since the quantity is automatically regulated by the action of the device E H, (shown in section, Fig. 1, and plan, Fig. 2.) The same consists of a board, E, pivoted and supported upon the bar G, and provided at its front side with a transverse row of vertical rods or teeth, H, whose lower ends nearly touch the teeth $c$ of apron C' as the latter travels beneath them. The teeth H serve to spread out the straw, and prevent an undue quantity of it passing at any one time, and thus control and regulate the supply to the cylinder, so that the latter can never become clogged, and thus fail to perform its function perfectly.

The board E is inclined downward toward the rear end of the machine, so that it approaches the surface of the apron contiguous to the rods L. The inclination of the board, and also the height of the teeth H from the apron C', may be changed at will by means of the adjusting screw-shafts I, passing through the ends of bar G, from which the upper end of the board E is suspended. But the lower end of said board will be held fixed by the lugs or brackets $m$ when the upper end is being adjusted. By its inclination the board E serves to compress and compact the grain, and this function is performed in the same manner, whether the teeth H be adjusted higher or lower.

The straw passes from the apron C' directly to and between the feed-rolls K, and is by them delivered to the thrashing-cylinder. The means or devices for conveying it from the apron C' to said rolls K are rods L, which are attached to a cross-bar directly in rear of the rolls, and whose free ends extend forward and lie in the longitudinal parallel grooves of the apron, so as to pass beneath the straw as it advances.

The variation in the quantity of straw passed between the rolls K at different times requires that the upper one shall be made vertically adjustable. Spiral springs $e$ are arranged to press upon its journals, and thus cause it to exert the requisite pressure upon the lower roll, and it is coupled by a universal joint, $f$, to the shaft $g$, from which it derives motion. $h$ is the main motor-shaft of the feeder, and from it motion is imparted to the other parts by a suitable arrangement of gears, $i$.

The machine being adapted to automatically regulate the quantity of grain supplied to the thrasher, it is evident no grain can be wasted, since the cylinder will never become clogged. The feeder is simple in construction, and may be easily attached to and detached from the thrasher.

What I claim is—

1. The combination, with apron C′, of the inclined board E, having teeth H, the fixed lugs *a*, the cross-bar G, and screw-shafts I, as shown and described, to operate as specified.

2. The combination of the rods L with the channeled belt or apron, substantially as shown and described.

The above specification of my invention signed by me this 29th day of June, 1876.

J. W. DOZIER.

Witnesses:
SOLON C. KEMON,
CHAS. A. PETTIT.